(12) United States Patent
Hu et al.

(10) Patent No.: US 9,065,764 B2
(45) Date of Patent: Jun. 23, 2015

(54) METHOD, APPARATUS AND SYSTEM FOR MAINTAINING QUALITY OF SERVICE QOS

(71) Applicant: Huawei Technologies Co., Ltd., Shenzhen, Guangdong (CN)

(72) Inventors: Haitao Hu, Shenzhen (CN); Jinjin Chen, Shenzhen (CN); Zhiyong Yan, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

(21) Appl. No.: 13/949,832

(22) Filed: Jul. 24, 2013

(65) Prior Publication Data

US 2013/0315245 A1 Nov. 28, 2013

Related U.S. Application Data

(63) Continuation of application No. PCT/CN2012/070235, filed on Jan. 11, 2012.

(30) Foreign Application Priority Data

Jan. 24, 2011 (CN) .......................... 2011 1 0025750

(51) Int. Cl.
*H04L 12/28* (2006.01)
*H04L 12/725* (2013.01)
(Continued)

(52) U.S. Cl.
CPC .............. *H04L 45/302* (2013.01); *H04L 12/56* (2013.01); *H04L 12/4633* (2013.01); *H04L 47/2458* (2013.01); *H04L 47/2441* (2013.01); *H04L 47/825* (2013.01); *H04L 12/5602* (2013.01)

(58) Field of Classification Search
USPC ........... 370/229, 252, 310.1, 389, 392, 395.1, 370/395.7, 395.71, 412, 474
See application file for complete search history.

(56) References Cited

U.S. PATENT DOCUMENTS 5,959,991 A * 9/1999 Hatono et al. .............. 370/235.1
6,567,378 B1 * 5/2003 Yuan et al. .................... 370/235
(Continued)

FOREIGN PATENT DOCUMENTS

| CN | 1250287 A | 4/2000 |
|---|---|---|
| CN | 1859264 A | 11/2006 |

(Continued)

OTHER PUBLICATIONS

Martini et al., "Encapsulation Methods for Transport of Asynchronous Transfer Mode (ATM) over MPLS Networks," Network Working Group memo, The IETF Trust (Dec. 2006).
(Continued)

*Primary Examiner* — Kwang B Yao
*Assistant Examiner* — Nguyen Ngo
(74) *Attorney, Agent, or Firm* — Leydig, Voit & Mayer, Ltd.

(57) ABSTRACT

The present invention discloses a method for maintaining quality of service QoS, which includes: identifying a CLP and a service type of a newly received ATM cell, and obtaining a corresponding QoS label; when the QoS label corresponding to the newly received ATM cell is different from a QoS label corresponding to a buffered ATM cell, encapsulating the buffered ATM cell into a pseudo wire PW packet in a concatenation manner and sending the pseudo wire PW packet, where the QoS label corresponding to the buffered ATM cell is used as a QoS label of a PSN transport header of the PW packet, or is used as QoS labels of both the PSN transport header and a PW header of the PW packet, and buffering the newly received ATM cell. The present invention further provides a corresponding provider edge PE device and a corresponding ATM PWE3 system.

10 Claims, 7 Drawing Sheets

(51) Int. Cl.
*H04L 12/54* (2013.01)
*H04L 12/46* (2006.01)
*H04L 12/833* (2013.01)
*H04L 12/851* (2013.01)
*H04L 12/911* (2013.01)

(56) References Cited

U.S. PATENT DOCUMENTS

| | | | |
|---|---|---|---|
| 6,611,522 B1 * | 8/2003 | Zheng et al. | 370/395.21 |
| 6,658,014 B1 * | 12/2003 | Tezuka | 370/412 |
| 7,382,783 B2 * | 6/2008 | Kawakami et al. | 370/395.52 |
| 2002/0012348 A1 * | 1/2002 | Mizuhara et al. | 370/392 |
| 2003/0039246 A1 * | 2/2003 | Guo et al. | 370/389 |
| 2003/0118026 A1 * | 6/2003 | Kuhl et al. | 370/395.21 |
| 2004/0156313 A1 | 8/2004 | Hofmeister et al. | |
| 2004/0228274 A1 * | 11/2004 | Yazaki et al. | 370/229 |
| 2005/0169279 A1 * | 8/2005 | Magd et al. | 370/395.5 |
| 2005/0220143 A1 * | 10/2005 | DelRegno et al. | 370/471 |
| 2009/0116493 A1 | 5/2009 | Zhu et al. | |
| 2009/0141740 A1 * | 6/2009 | Baruah et al. | 370/469 |

FOREIGN PATENT DOCUMENTS

| | | |
|---|---|---|
| CN | 101102261 A | 1/2008 |
| CN | 102137008 A | 7/2011 |
| EP | 0982967 A2 | 3/2000 |
| EP | 1585259 A1 | 10/2005 |
| WO | 0131854 A1 | 5/2001 |

OTHER PUBLICATIONS

International Search Report in corresponding PCT Patent Application No. PCT/CN2012/070235 (Apr. 12, 2012).
Written Opinion of the International Searching Authority in corresponding PCT Patent Application No. PCT/CN2012/070235 (Apr. 12, 2012).

* cited by examiner

METHOD, APPARATUS AND SYSTEM FOR MAINTAINING QUALITY OF SERVICE QOS

CROSS-REFERENCE TO RELATED APPLICATIONS

This application is a continuation of International Patent Application No. PCT/CN2012/070235, filed on Jan. 11, 2012, which claims priority to Chinese Patent Application No. 201110025750.0, filed on Jan. 24, 2011, both of which are hereby incorporated by reference in their entireties.

FIELD OF THE INVENTION

The present invention relates to the field of communications technologies, and in particular, to a method, an apparatus and a system for maintaining quality of service QoS.

BACKGROUND OF THE INVENTION

Pseudo wire emulation edge to edge (Pseudo Wire Emulation Edge to Edge, PWE3) refers to an edge-to-edge layer 2 service bearing technology, which simulates in a packet switched network (Packet Switched Network, PSN) as realistically as possible basic behaviors and features of services such as an asynchronous transfer mode (Asynchronous Transfer Mode, ATM), frame relay, Ethernet, a low speed time division multiplexing (Time Division Multiplexing, TDM) circuit, a synchronous optical network (Synchronous Optical Network, SONET) and a synchronous digital hierarchy (Synchronous Digital Hierarchy, SDH), and is a point-to-point layer 2 virtual private network (Layer 2 virtual private network, L2VPN).

ATM PWE3 is a technology for bearing an ATM cell in a PWE3 virtual circuit, in which conventional ATM networks are connected by using a PSN network, and emulation of an ATM service is provided in the PSN network. When a conventional ATM network service traverses the PSN network, the original service is emulated to the largest extent, so that an end customer does not feel a difference and investments of the customer user and a provider are protected during network integration and construction.

Referring to FIG. 1 and FIG. 2, the RFC4717 standard formulated by the Internet Engineering Task Force (Internet Engineering Task Force, IETF) defines a reference model of the ATM PWE3. In the ATM PWE3, various layer 2 services of an end of a customer edge (Customer Edge, CE) device, for example, various layer 2 data packets are transparently transferred through a PSN tunnel (Tunner) connecting two provider edge (Provider Edge, PE) devices, for example, a multiprotocol label switching tunnels (Multiprotocol Label Switching Tunner, MPLS Tunner) connecting PE1 and PE2. Between a CE and a PE is an ATM interface (Service) or an x digital subscriber line (x Digital Subscribe Line, xDSL) interface of an ATM mode, where a data encapsulation form is an ATM cell. A tunnel may have a plurality of pseudo wires (Pseudo Wire, PW) used for bearing and transferring a PW packet in which an ATM cell is encapsulated.

The ATM PWE3 has a plurality of encapsulation manners, including: a one to one (one to one) encapsulation manner, an N to one (N to one) encapsulation manner, and the like. According to different ATM connection types borne in a PW packet, the one to one encapsulation manner further includes: a one to one virtual circuit connection (Virtual Circuit Connection, VCC) encapsulation manner and a one to one virtual path connection (Virtual Path Connection, VPC) encapsulation manner; and the N to one encapsulation manner further includes: an N to one virtual circuit connection (Virtual Circuit Connection, VCC) encapsulation manner and an N to one virtual path connection (Virtual Path Connection, VPC) encapsulation manner.

The RFC4717 standard formulated by the IETF defines an encapsulation method of the ATM PWE3. Referring to FIG. 3 and FIG. 4, N to one ATM PWE3 encapsulation and one to one ATM PWE3 encapsulation each include four domains, which successively are: a PSN transport header, a PW header, an ATM control word, and an ATM service payload. When only one ATM cell is encapsulated into a PW packet, encapsulation efficiency is low, and a bandwidth utilization rate is low. Therefore, RFC4717 defines a method for encapsulating a plurality of ATM cells into a PW packet, which is referred to as cell concatenation.

Referring to FIG. 5 and FIG. 6, when the cell concatenation is not used, one PW packet has only one ATM cell. A cell loss priority (Cell Loss Priority, CLP) bit in an ATM cell header may be mapped to a quality of service (Quality of Service, QoS) label of a PSN transport header or a PW header, so as to provide QoS consistent with a CLP of the encapsulated ATM cell during transport in the PSN. When the CLP bit is 1, it represents that the ATM cell may be discarded, and at this time, the QoS is labeled as a low priority. When the CLP bit is 0, it represents that the ATM cell cannot be discarded, and at this time, the QoS is labeled as a high priority.

When cell concatenation encapsulation is adopted, as shown in FIG. 7 and FIG. 8, one PW packet may contain a plurality of ATM cells. Because different ATM cells have different CLP bits and different service types, priorities required to be mapped to QoS labels are also different. For this problem, the RFC4717 suggests that the highest among priorities which is of all the ATM cells in one PW packet and are required to be mapped to QoS labels be mapped to a QoS label of a PSN transport header or a PW header. This causes that the QoS grade of another ATM cell of a low priority in the PW packet is raised during PSN transport, so that the encapsulated ATM cells do not completely emulate an original service during the transport in the PSN.

SUMMARY OF THE INVENTION

Embodiments of the present invention provide a method, an apparatus and a system for maintaining quality of service QoS.

A method for maintaining quality of service QoS includes:

identifying, by a provider edge PE device, a cell loss priority CLP and a service type of a newly received asynchronous transfer mode ATM cell, and obtaining a corresponding quality of service QoS label according to the CLP and the service type;

when a buffered ATM cell exists in a local buffer, performing comparison to find whether the QoS label corresponding to the newly received ATM cell is the same as a QoS label corresponding to the buffered ATM cell;

if the same, buffering the newly received ATM cell; and if different, encapsulating the buffered ATM cell into a pseudo wire PW packet in a concatenation manner, and sending the pseudo wire PW packet, where the QoS label corresponding to the buffered ATM cell is used as a QoS label of a packet switched network PSN transport header of the PW packet, or is used as QoS labels of both the PSN transport header and a PW header of the PW packet, and buffering the newly received ATM cell.

A provider edge PE device includes:

a priority obtaining unit, configured to identify a cell loss priority CLP and a service type of a newly received asynchronous transfer mode ATM cell, and obtain a corresponding quality of service QoS label according to the CLP and the service type;

a processing unit, configured to determine whether an ATM cell is stored in a combination and buffering unit, and if yes, perform comparison to find whether the QoS label corresponding to the newly received ATM cell is the same as a QoS label corresponding to the buffered ATM cell; if the same, instruct the combination and buffering unit to buffer the newly received ATM cell; and if different, instruct an encapsulation and sending unit to encapsulate and send the ATM cell stored in the combination and buffering unit, and instruct the combination and buffering unit to buffer the newly received ATM cell;

the combination and buffering unit, configured to, according to an instruction of the processing unit, buffer the newly received ATM cell; and the encapsulation and sending unit, configured to, according to an instruction of the processing unit, encapsulate the ATM cell, buffered in the combination and buffering unit, into a pseudo wire PW packet in a concatenation manner and send the pseudo wire PW packet, where the QoS label corresponding to the buffered ATM cell is used as a QoS label of a packet switched network PSN transport header of the PW packet, or is used as QoS labels of both the PSN transport header and a PW header of the PW packet.

An asynchronous transfer mode pseudo wire emulation edge to edge ATM PWE3 system includes: a customer edge CE device and a provider edge PE device, where the CE device is configured to send an asynchronous transfer mode ATM cell to the PE device connected to it; and the PE device is configured to receive the ATM cell sent by the CE device, identify a cell loss priority CLP and a service type of the newly received ATM cell, and obtain a corresponding quality of service QoS label according to the CLP and the service type; and when a buffered ATM cell exists in a local buffer, perform comparison to find whether the QoS label corresponding to the newly received ATM cell is the same as a QoS label corresponding to the buffered ATM cell; if the same, buffer the newly received ATM cell; and if different, encapsulate the buffered ATM cell into a pseudo wire PW packet in a concatenation manner and send the pseudo wire PW packet, where the QoS label corresponding to the buffered ATM cell is used as a QoS label of a packet switched network PSN transport header of the PW packet, or is used as QoS labels of both the PSN transport header and a PW header of the PW packet, and buffer the newly received ATM cell.

In the method for maintaining QoS provided in the embodiment of the present invention, when a priority of the newly received ATM cell is different from the priority of a buffered ATM cell, the buffered ATM cell is encapsulated into the PW packet in a concatenation manner and sent, where the QoS label corresponding to the buffered ATM cell is used as the QoS label of the PSN transport header of the PW packet, or is used as the QoS labels of both the PSN transport header and the PW header, so that priorities of all ATM cells contained in one PW packet are the same, thereby completely emulating an original service.

DETAILED DESCRIPTION OF THE EMBODIMENTS

Embodiments of the present invention provide a method for maintaining quality of service QoS. When a priority of a newly received ATM cell is different from a priority of a buffered ATM cell, the buffered ATM cell is encapsulated into a PW packet in a concatenation manner and sent, where a QoS label corresponding to the buffered ATM cell is used as QoS label of a PSN transport header of the PW packet, or is used as QoS labels of both the PSN transport header and a PW header of the PW packet, so that priorities of all ATM cells contained in one PW packet are the same, thereby completely emulating an original service. The embodiments of the present invention also provide a corresponding provider edge PE device and a corresponding ATM PWE3 system, which are illustrated in detail in the following.

An embodiment of the present invention provides a method for maintaining quality of service QoS, which is applied to ATM PWE3 using concatenation encapsulation. Referring to a system networking diagram of the ATM PWE3 shown in FIG. 9, where PE1 and PE2 are provider edge devices in a PSN network, and CE1 and CE2 are customer edge devices in ATM networks. PE1 is connected to CE1 through an ATM interface, PE2 is connected to CE2 through an ATM interface, and a PWE3 pseudo wire linking PE1 and PE2 is established in the PSN network. Assuming CE1 prepares to send an ATM cell to CE2, CE1 first sends the ATM cell to PE1. After encapsulating the ATM cell into a PW packet, PE1 sends the PW packet to PE2 along the PWE3 pseudo wire. After decapsulating the PW packet, PE2 sends the ATM cell in the PW packet to CE2.

Figure 10:
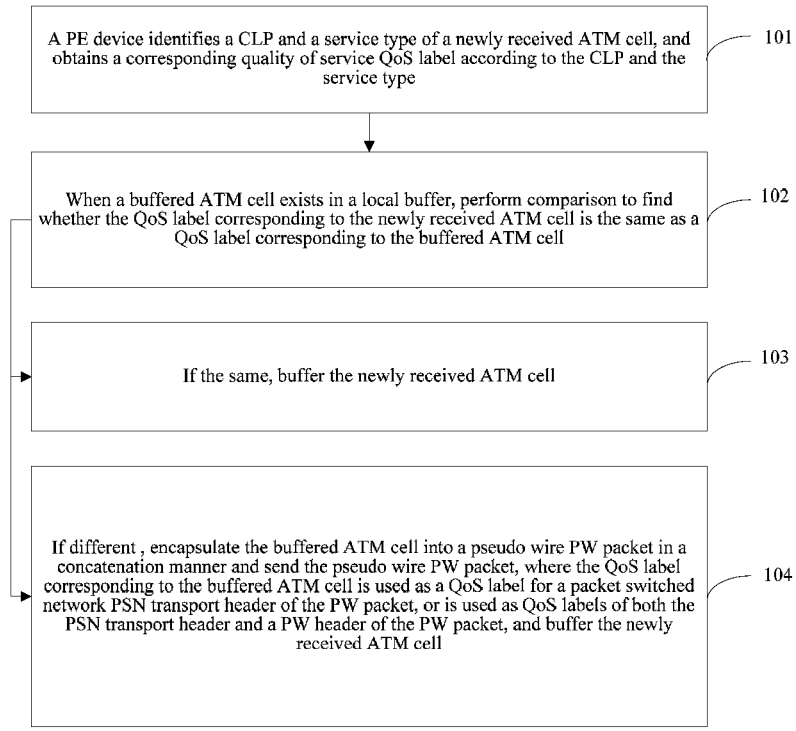
FIG. 10 is a flow chart of a method for maintaining quality of service QoS according to an embodiment of the present invention.

Referring to FIG. 10, an embodiment of the present invention provides a method for maintaining quality of service QoS, which includes:

101: A provider edge PE device identifies a cell loss priority CLP and a service type of a newly received asynchronous transfer mode ATM cell, and obtains a corresponding quality of service QoS label according to the CLP and the service type.

After receiving the ATM cell sent by a CE device, the PE device first identifies the CLP and the service type in an ATM cell header, and according to the CLP and the service type, obtains the QoS label that may be mapped to a PSN transport header and a PW header of a PW packet, so as to decide, through the QoS label and in subsequent steps, the number of ATM cells which is encapsulated into a PW packet in a concatenation manner.

When a CLP bit of the ATM cell is 1, it represents that the ATM cell may be discarded, so that QoS corresponding to the ATM cell may be labeled as a low priority. When the CLP bit is 0, it represents that the ATM cell cannot be discarded, so that the QoS corresponding to the ATM cell may be labeled as a high priority.

Because the CLP bit may be mapped to two priorities, two priorities may be defined for each service type in advance, so that a QoS label corresponding to each ATM cell is obtained through mapping.

Service types of an ATM cell include: a constant bit rate (Constant Bit Rite, CBR), a variable bit rate (Variable Bit Rite, VBR), a real time-variable bit rate (real time-Variable Bit Rite, rt-VBR), an unspecified bit rate (Unspecified Bit Rite, UBR), and the like, which are not limited in this specification.

Priorities of the foregoing four service types may be set in descending order which is CBR, rt-VBR, VBR, and UBR. A value of a CLP bit of each ATM cell includes two types: 0 and 1. Therefore, a priority of a QoS label corresponding to an ATM cell with a service type being the UBR and a CLP bit being 1 may be the lowest, namely, 0, a priority of a QoS label corresponding to an ATM cell with a service type being the UBR and a CLP bit being 0 may be 1, a priority of a QoS label corresponding to an ATM cell with a service type being the VBR and a CLP bit being 1 may be 2, a priority of a QoS label corresponding to an ATM cell with a service type being the VBR and a CLP bit being 0 may be 3, . . . , and a priority of a QoS label corresponding to an ATM cell with a service type being the CBR and a CLP bit being 0 may be the highest, namely, 8.

102: When a buffered ATM cell exists in a local buffer, perform comparison to find whether the QoS label corresponding to the newly received ATM cell is the same as a QoS label corresponding to the buffered ATM cell.

After receiving the ATM cell sent by the CE device, the PE device first determines whether an ATM cell to be encapsulated and sent is buffered in the local buffer; if no, the PE device directly buffers the newly received ATM cell as a first ATM cell in a next PW packet to be encapsulated and sent. If a buffered ATM cell exists in the local buffer, the PE device further needs to perform comparison to find whether the QoS label corresponding to the newly received ATM cell is the same as the QoS label corresponding to the buffered ATM cell, so as to decide whether to directly buffer the newly received ATM cell.

103: If the QoS label corresponding to the newly received ATM cell is the same as the QoS label corresponding to the buffered ATM cell, buffer the newly received ATM cell.

When the QoS label corresponding to the newly received ATM cell is the same as the QoS label corresponding to the buffered ATM cell, the newly received ATM cell is directly buffered, so that all ATM cells in the local buffer correspond to the same QoS label.

In an embodiment, after the newly received ATM cell is directly buffered, it further needs to be determined whether locally buffered ATM cells meet a sending condition, and if yes, all ATM cells, including the buffered newly received ATM cell, in the local buffer are encapsulated into one PW packet in the concatenation manner and sent, where the QoS label corresponding to the locally buffered ATM cells is used as a QoS label of a PSN transport header of the PW packet, or is used as QoS labels of both the PSN transport header and a PW header of the PW packet. The mentioned sending condition may include that: the number of received and buffered ATM cells reaches a maximum cell number, or a maximum cell packaging delay is reached, which is not limited in this embodiment. For example, a maximum cell number M may be preset, where M is a positive integer. Assuming M-1 ATM cells with a QoS label being 2 exist in the local buffer, after a newly received ATM cell with a QoS label also being 2 is directly buffered, the number of ATM cells in the local buffer reaches M, and the sending condition is met, and then the M ATM cells are encapsulated into one PW packet in the concatenation manner and sent. A QoS label of a PSN transport header of the PW packet is 2, or QoS labels of the PSN transport header and a PW header are both 2.

104: If the QoS label corresponding to the newly received ATM cell is different from the QoS label corresponding to the buffered ATM cell, encapsulate the buffered ATM cell into a pseudo wire PW packet in the concatenation manner and send the pseudo wire PW packet, where the QoS label corresponding to the buffered ATM cell is used as a QoS label of a packet switched network PSN transport header of the PW packet, or is used as QoS labels of both the PSN transport header and a PW header of the PW packet, and buffer the newly received ATM cell.

When the QoS label corresponding to the newly received ATM cell is different from the QoS label corresponding to the buffered ATM cell, existing ATM cells in the local buffer are encapsulated into one PW packet in the concatenation manner, and sent to a receiving end PE device, where the QoS label corresponding to the buffered ATM cell is used as a QoS label of the PSN transport header of the PW packet, or is used as QoS labels of both the PSN transport header and the PW header. After the PW packet is sent, the newly received ATM cell may be buffered, so that the newly received ATM cell is used as a first ATM cell in a next PW packet. The newly received ATM cell having the different QoS label may also be buffered first, but during encapsulation of the PW packet, only the previously buffered ATM cells with same QoS labels are encapsulated and sent, and the newly received ATM cell is kept in the local buffer. Definitely, the step of encapsulating and sending the PW packet and the step of buffering the newly received ATM cell may be simultaneously performed. In these several implementation manners, the step of encapsulating and sending the PW packet and the step of buffering the newly received ATM cell do not have specific order in time, as long as it is ensured that the encapsulated and sent PW packet does not include the newly received ATM cell having the different QoS label, and the newly received ATM cell is buffered at appropriate time.

In an example, it is assumed that n-m ATM cells from the $m^{th}$ to the $n^{th}$ are saved in the local buffer, corresponding QoS labels are 2, and a QoS label corresponding to a newly received (n+1)th ATM cell is 3. Then the buffered n-m ATM cells are encapsulated into one PW packet in the concatenation manner and sent, and QoS of a PSN transport header of the PW packet is labeled as 2, or a QoS label of the PSN transport header of the PW packet and a QoS label of a header of the PW packet are both 2. After the n-m ATM cells are encapsulated in the concatenation manner, or at other appropriate time, the (n+1)th ATM cell is buffered, and the (n+1)th ATM cell becomes a first ATM cell to be encapsulated in the concatenation manner into a next PW packet. n and m are both positive integers, and n≥m.

By adopting the method provided by the embodiment of the present invention, when a priority of the newly received ATM cell is the same as a priority of the buffered ATM cell, the newly received ATM cell may be directly buffered. When the priority of the newly received ATM cell is different from the priority of the buffered ATM cell, the buffered ATM cell may be encapsulated into a PW packet in the concatenation manner and sent, and the newly received ATM cell is buffered, so that priorities of all the ATM cells buffered in the local buffer are the same, thereby ensuring that priorities of all ATM cells contained in each PW packet are the same, and making the QoS label of the PSN transport header or the PW header of the PW packet truly reflect the priorities of all the ATM cells of the PW packet. A problem that a QoS priority of an ATM cell of a low priority in a PW packet is raised during PSN transport in the prior art is solved, thereby providing more accurate quality of service. The method for maintaining QoS in the embodiment of the present invention is applicable to one to one ATM PWE3 cell concatenation encapsulation and N to one ATM PWE3 cell concatenation encapsulation.

In another embodiment of the present invention, that the PE device buffers the newly received ATM cell may specifically be: buffering the newly received ATM cell in one combination and buffering subunit in the local buffer, where the combination and buffering subunit is configured to buffer an ATM cell belonging to a same VCC or VPC as the newly received ATM cell.

A plurality of VCCs, or a plurality of VPCs, or a plurality of VCCs and VPCs may exist in a PSN tunnel of the ATM PWE3. One combination and buffering subunit may be set for an ATM cell of each VCC or VPC, and each combination and buffering subunit only buffers an ATM cell of one VCC or VPC. In this way, newly received ATM cells may be buffered according to different VCCs or VPCs, and working efficiency of the PE device may be improved.

Further, step 102 may be specifically:

102a: Identify a VCC or a VPC to which the newly received ATM cell belongs.

102b: Determine whether a buffered ATM cell exists in a combination and buffering subunit which is in the local buffer and is configured to buffer an ATM cell belonging to the same VCC or VPC as the newly received ATM cell.

102c: When a buffered ATM cell exists in the combination and buffering subunit, perform comparison to find whether the QoS label corresponding to the newly received ATM cell is the same as a QoS label corresponding to the ATM cell buffered in the combination and buffering subunit.

In this step, after the new ATM cell is received, the newly received ATM cell is only compared with the ATM cell that is saved in a sub-buffer and belongs to the same VCC or VPC as the newly received ATM cell, to find whether the ATM cells correspond to the same QoS label.

When ATM cells saved in a certain sub-buffer unit meets the sending condition, only the ATM cells in the sub-buffer are encapsulated into a PW packet in the concatenation manner and sent, so that the ATM cells in the PW packet not only have same priorities but also belong to a same VCC or VPC, thereby providing more accurate quality of service.

Specific examples of application scenarios are adopted in the following to further illustrate the method provided in the embodiment of the present invention.

Figure 11:
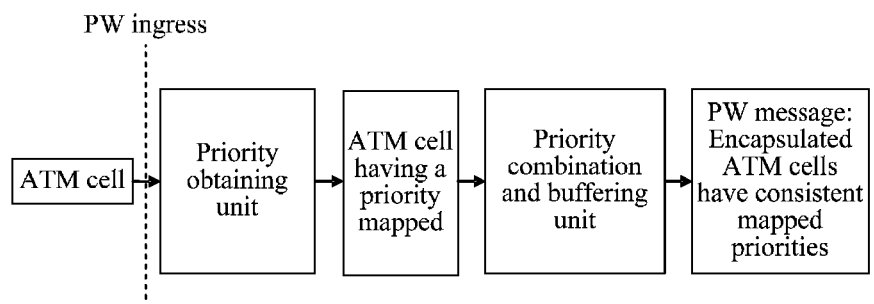
FIG. 11 is a schematic diagram of a method for maintaining QoS being applied to an application scenario according to the present invention.

Referring to FIG. 11, for one to one ATM PWE3 cell concatenation encapsulation, one PW only bears one VCC or VPC. The method provided in a first embodiment of the present invention may be adopted in this application scenario.

After reaching a PW ingress, an ATM cell first enters a priority obtaining unit of a PE device, and the priority obtaining unit identifies a CLP and a service type of the newly received ATM cell, and obtains a corresponding QoS label through mapping. Then the ATM cell enters a priority combination and buffering unit, and it is determined whether an ATM cell is saved in a local buffer. If no, the newly received ATM cell is buffered and waits to be encapsulated and sent. If a buffered ATM cell exists, comparison is performed to find whether the QoS label corresponding to the newly received ATM cell is the same as a QoS label corresponding to the buffered ATM cell. If the same, the newly received ATM cell is buffered and waits to be encapsulated and sent. If not the same, the ATM cell buffered in the priority combination and buffering unit is first encapsulated into one PW packet in a concatenation manner and sent, and then the newly received ATM cell is buffered and waits to be encapsulated and sent, where the QoS label corresponding to the buffered ATM cell is used as a QoS label of a PSN transport header of the PW packet, or is used as QoS labels of both the PSN transport header and a PW header of the PW packet.

Figure 12:
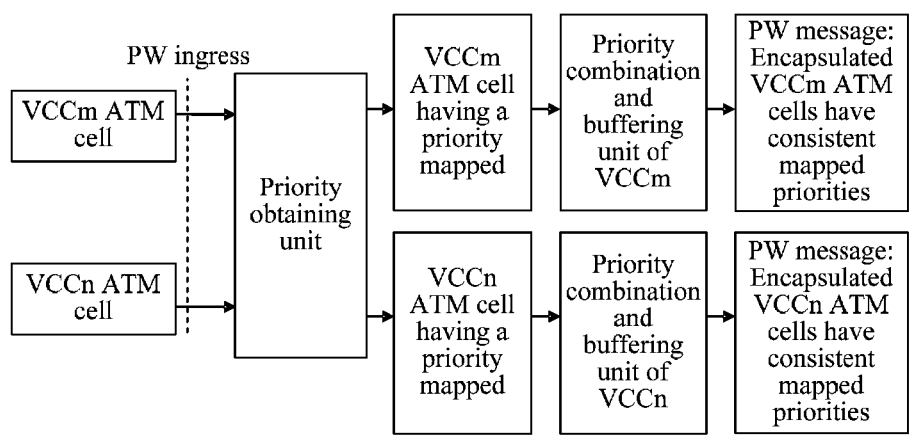
FIG. 12 is a schematic diagram of a method for maintaining QoS being applied to another application scenario according to the present invention.

Referring to FIG. 12, for N to one ATM PWE3 cell concatenation encapsulation, one PW may bear a plurality of VCCs or VPCs. The method provided by a second embodiment of the present invention may be adopted in the application scenario.

After reaching a PW ingress, an ATM cell first enters a priority obtaining unit of a PE device, and the priority obtaining unit identifies a CLP and a service type of the newly received ATM cell, and obtains a corresponding QoS label through mapping. Then, the ATM cell enters a priority combination and buffering unit. It should be noted that one independent priority combination and buffering subunit may be set for each VCC or VPC, and the newly received ATM cell enters a corresponding priority combination and buffering subunit. A VCC or VPC of the newly received ATM cell is identified, and it is determined whether an ATM cell belonging to one same VCC or VPC as the newly received ATM cell is saved in a priority combination and buffering subunit corresponding to the VCC or VPC. If no, the newly received ATM cell is buffered and waits to be encapsulated and sent; and if a buffered ATM cell exists, comparison is performed to find whether the QoS label corresponding to the newly received ATM cell is the same as a QoS label corresponding to the buffered ATM cell. If the same, the newly received ATM cell is buffered and waits to be encapsulated and sent. If not the same, the ATM cell buffered in the priority combination and buffering subunit is first encapsulated into a PW packet in a concatenation manner and sent, and then the newly received ATM cell is buffered and waits to be encapsulated and sent, where the QoS label corresponding to the buffered ATM cell is used as a QoS label of a PSN transport header of the PW packet, or is used as QoS labels of both the PSN transport header and a PW header.

Figure 13:
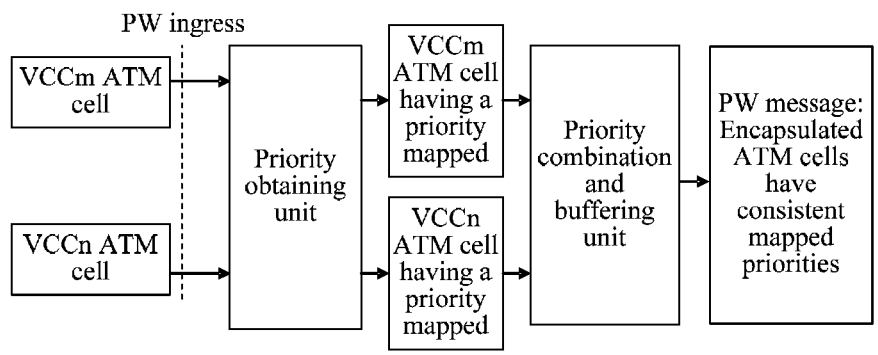
FIG. 13 is a schematic diagram of a method for maintaining QoS being applied to still another application scenario according to the present invention.

Referring to FIG. 13, for an application scenario of N to one ATM PWE3 cell concatenation encapsulation, the method provided in the first embodiment of the present invention may be adopted without considering whether ATM cells belong to a same VCC or VPC. That is, only one priority combination and buffering unit may be set in a PE device, instead of that a plurality of priority combination and buffering subunits are set according to different VCCs or VPCs.

After reaching a PW ingress, an ATM cell first enters a priority obtaining unit of the PE device, and the priority obtaining unit identifies a CLP and a service type of the newly received ATM cell, and obtains a corresponding QoS label through mapping. Then the ATM cell enters the priority combination and buffering unit, and it is determined whether an ATM cell is saved in a local buffer. If no, the newly received ATM cell is buffered and waits to be encapsulated and sent. If a buffered ATM cell exists, comparison is performed to find whether the QoS label corresponding to the newly received ATM cell is the same as a QoS label corresponding to the buffered ATM cell. If the same, the newly received ATM cell is buffered and waits to be encapsulated and sent. If not the same, the ATM cell buffered in the priority combination and buffering unit is first encapsulated into a PW packet in a concatenation manner and sent, and then the newly received ATM cell is buffered and waits to be encapsulated and sent, where the QoS label corresponding to the buffered ATM cell is used as a QoS label of a PSN transport header of the PW packet, or is used as QoS labels of both the PSN transport header and a PW header.

Figure 14:
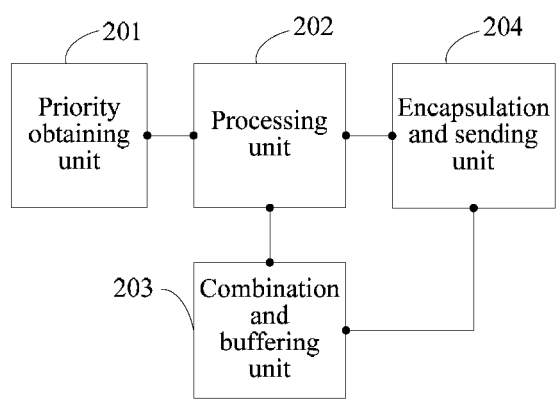
FIG. 14 is a schematic diagram of a provider edge PE device according to an embodiment of the present invention.

Referring to FIG. 14, an embodiment of the present invention further provides a provider edge PE device, applied to ATM PWE3 using concatenation encapsulation. The PE device includes: a priority obtaining unit 201, a processing unit 202, a combination and buffering unit 203, and an encapsulation and sending unit 204, where the priority obtaining unit 201 is configured to identify a cell loss priority CLP and a service type of a newly received asynchronous transfer mode ATM cell, and obtain a corresponding quality of service QoS label according to the CLP and the service type;

the processing unit 202 is configured to determine whether an ATM cell is stored in the combination and buffering unit 203, and if yes, perform comparison to find whether the QoS label corresponding to the newly received ATM cell is the same as a QoS label corresponding to the buffered ATM cell; if the same, instruct the combination and buffering unit 203 to buffer the newly received ATM cell; and if different, instruct the encapsulation and sending unit 204 to encapsulate and send the ATM cell stored in the combination and buffering unit, and instruct the combination and buffering unit 203 to buffer the newly received ATM cell;

the combination and buffering unit 203 is configured to, according to an instruction of the processing unit 202, buffer the newly received ATM cell; and the encapsulation and sending unit 204 is configured to, according to an instruction of the processing unit 202, encapsulate the ATM cell, buffered in the combination and buffering unit 203, into a pseudo wire PW packet in a concatenation manner and send the PW packet, where the QoS label corresponding to the buffered ATM cells is used as a QoS label of a packet switched network PSN transport header of the PW packet, or is used as QoS labels of both the PSN transport header and a PW header of the PW packet.

Figure 15:
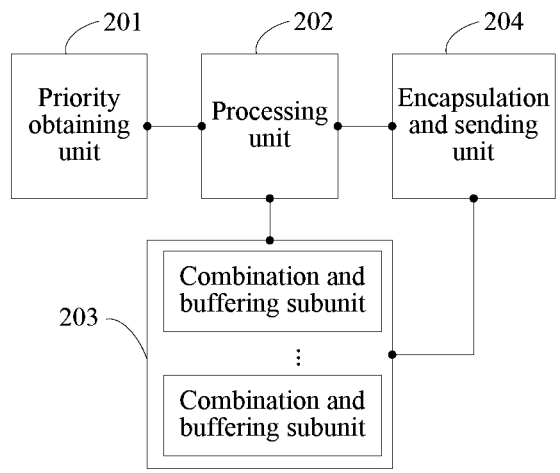
FIG. 15 is a schematic diagram of a provider edge PE device according to another embodiment of the present invention.

Referring to FIG. 15, the combination and buffering unit 202 may further include at least one combination and buffering subunit, where each combination and buffering subunit is configured to buffer an ATM cell of one VCC or VPC.

In an embodiment, the processing unit 202 is specifically configured to identify a VCC or VPC to which the newly received ATM cell belongs, determine whether a buffered ATM cell exists in a combination and buffering subunit configured to buffer an ATM cell belonging to the same VCC or VPC as the newly received ATM cell, and if yes, perform comparison to find whether the QoS corresponding to the newly received ATM cell is the same as QoS corresponding to the ATM cell buffered in the combination and buffering subunit; if the same, instruct the combination and buffering subunit to buffer the newly received ATM cell; and if different, instruct the encapsulation and sending unit 204 to encapsulate and send the ATM cell stored in the combination and buffering subunit, and instruct the combination and buffering subunit to buffer the newly received ATM cell.

In an embodiment, the processing unit 202 is further configured to, when it is determined that no ATM cell is stored in the combination and buffering unit 203, instruct the combination and buffering unit 203 to buffer the newly received ATM cell.

In an embodiment, the processing unit 202 is further configured to, after instructing the combination and buffering unit 203 to buffer the newly received ATM cell, determine whether ATM cells stored in the combination and buffering unit 203 meets a sending condition, and if yes, instruct the encapsulation and sending unit 204 to encapsulate and send the ATM cells stored in the buffering unit.

By adopting the PE device provided in the embodiment of the present invention, when a priority of the newly received ATM cell is the same as a priority of the buffered ATM cell, the newly received ATM cell may be directly buffered. When the priority of the newly received ATM cell is different from the priority of the buffered ATM cell, the buffered ATM cell may be encapsulated into a PW packet in the concatenation manner and sent, and the newly received ATM cell is buffered, so that priorities of all the ATM cells in the local buffer are the same, thereby ensuring that priorities of all ATM cells contained in each PW packet are the same, and making the QoS label of the PSN transport header and the PW header of the PW packet truly reflect the priorities of all the ATM cells of the PW packet. A problem that the QoS priority of an ATM cell of a low priority in a PW packet is raised during PSN transport in the prior art is solved, thereby providing more accurate quality of service.

Figure 1:
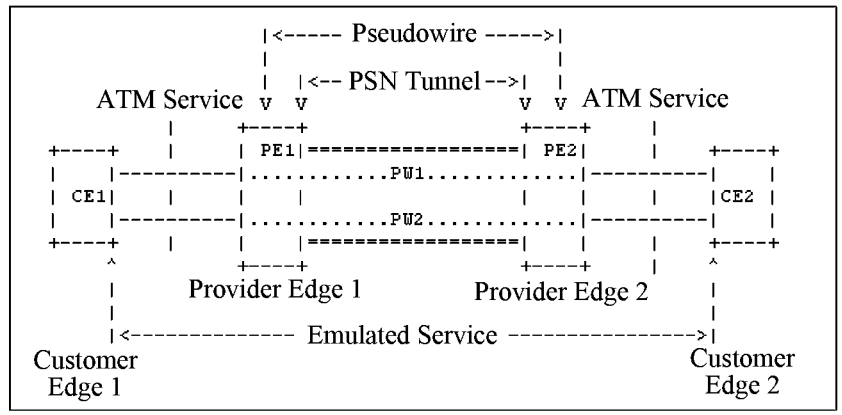
FIG. 1 is a reference model of ATM PWE3 defined by the RFC4717 standard.
Figure 2:
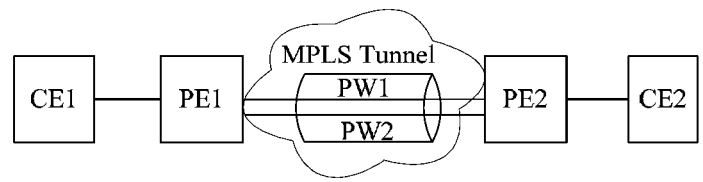
FIG. 2 is a schematic structural diagram of a PWE3 network topology based on MPLS.
Figure 3:
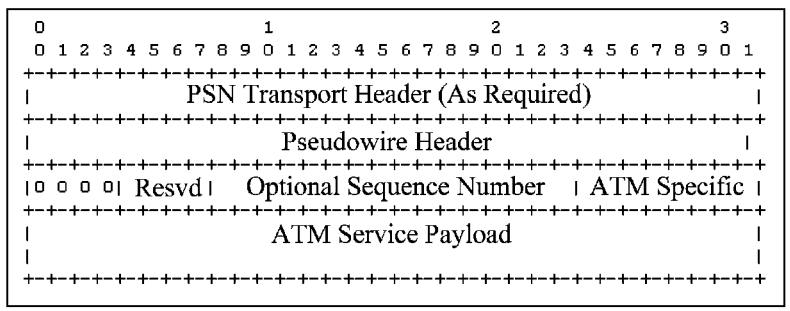
FIG. 3 is a schematic structural diagram of data encapsulated through one to one ATM PWE3.
Figure 4:
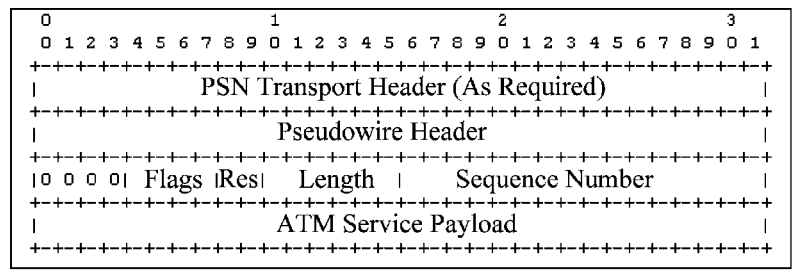
FIG. 4 is a schematic structural diagram of data encapsulated through N to one ATM PWE3.
Figure 5:
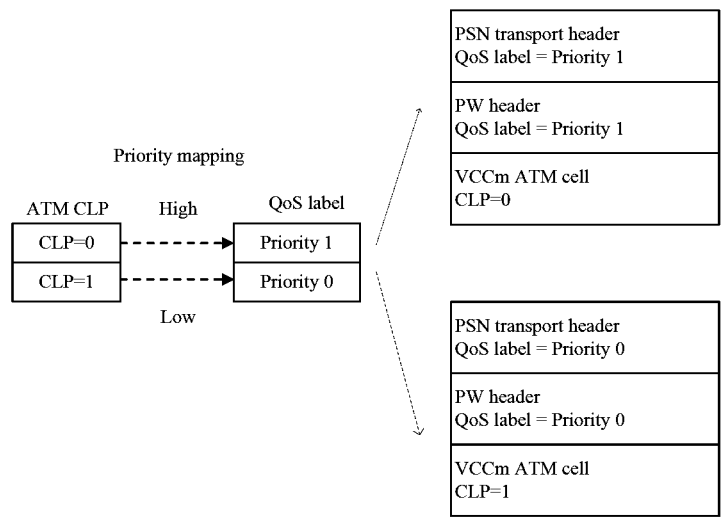
FIG. 5 is a schematic diagram of QoS label mapping in existing one to one ATM PWE3 encapsulation without cell concatenation.
Figure 6:
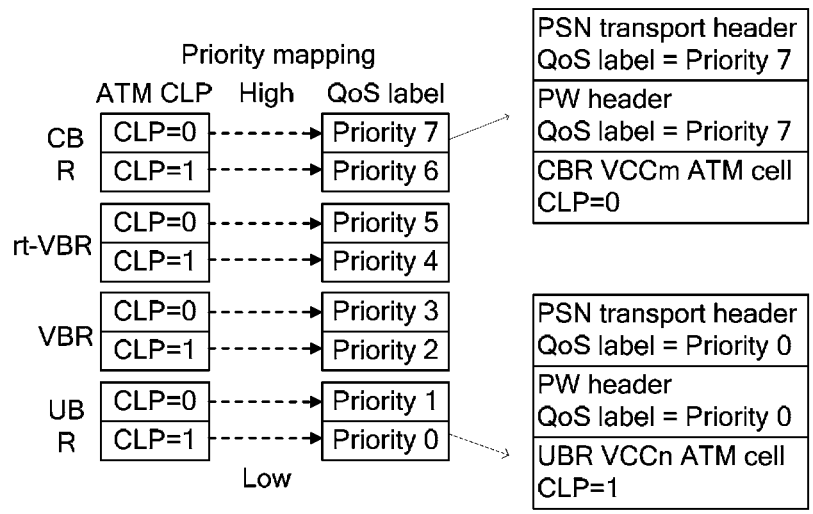
FIG. 6 is a schematic diagram of QoS label mapping in existing N to one ATM PWE3 encapsulation without cell concatenation.
Figure 7:
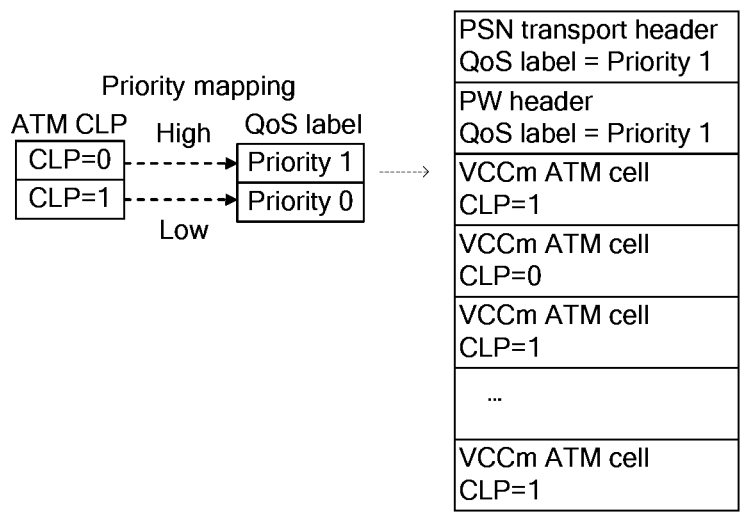
FIG. 7 is a schematic diagram of QoS label mapping in existing one to one ATM PWE3 encapsulation with cell concatenation.
Figure 8:
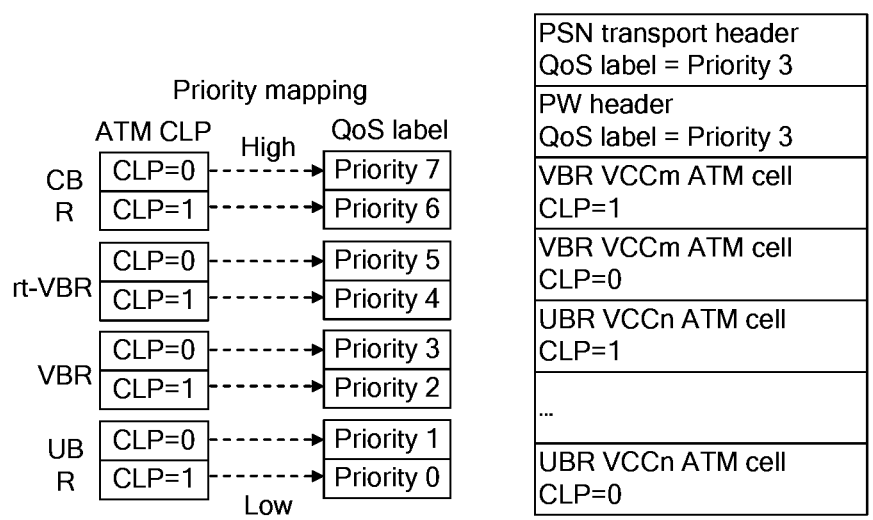
FIG. 8 is a schematic diagram of QoS label mapping in existing N to one ATM PWE3 encapsulation with cell concatenation.
Figure 9:
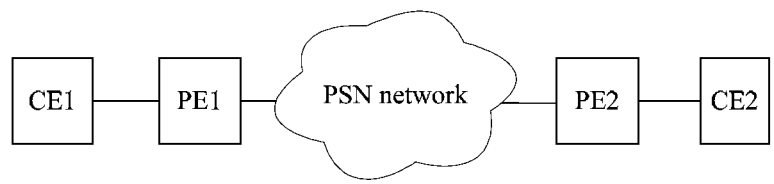
FIG. 9 is a system networking diagram related to a method for maintaining quality of service QoS according to an embodiment of the present invention.

Referring to FIG. 9, an embodiment of the present invention further provides an ATM PWE3 system, which at least includes customer edge CE devices CE1 and CE2 and provider edge PE devices PE1 and PE2. PE1 is connected to CE1 through an ATM interface, PE2 is connected to CE2 through an ATM interface, and a PWE3 pseudo wire linking PE1 and PE2 is established in a PSN network. Communication between CE1 and CE2 is that: CE1 first sends an ATM cell to PE1, after encapsulating the received ATM cell into a PW packet, PE1 sends the PW packet to PE2 along the PWE3 pseudo wire, and after decapsulating the PW packet, PE2 sends the obtained ATM cell to CE2; whereas a process that CE2 sends an ATM cell to CE1 is the same. Specifically:

a CE device is configured to send an asynchronous transfer mode ATM cell to a PE device connected to it; and a PE device is configured to receive the ATM cell sent by the CE device, identify a cell loss priority CLP and a service type of the newly received ATM cell, and obtain a corresponding quality of service QoS label according to the CLP and the service type; when a buffered ATM cell exists in a local buffer, perform comparison to find whether the QoS label corresponding to the newly received ATM cell is the same as a QoS label corresponding to the buffered ATM cell; if the same, buffer the newly received ATM cell; and if different, encapsulate the buffered ATM cell into a pseudo wire PW packet in a concatenation manner and send the pseudo wire PW packet, where the QoS label corresponding to the buffered ATM cell is used as a QoS label of a packet switched network PSN transport header of the PW packet, or is used as QoS labels of both the PSN transport header and a PW header, and buffer the newly received ATM cell.

The CE device may further be configured to receive an ATM cell sent from the PE device connected to it.

Likewise, the PE device may further be configured to parse the received PW packet, obtain the corresponding ATM cell, and send the corresponding ATM cell to a CE device connected to it.

The PE device involved in this embodiment is the PE device in the foregoing embodiment, which is not described herein again.

In the system provided in the embodiment of the present invention, when a priority of the newly received ATM cell is the same as a priority of the buffered ATM cell, the newly received ATM cell may be directly buffered. When the priority of the newly received ATM cell is different from the priority of the buffered ATM cell, the buffered ATM cell is encapsulated into a PW packet in a concatenation manner and sent, and the newly received ATM cell is buffered, so that priorities of all ATM cells buffered in the local buffer are the same, thereby ensuring that priorities of all ATM cells contained in each PW packet transported between the PEs are the same, and making the QoS label of the PSN transport header or the PW header of the PW packet truly reflect the priorities of all the ATM cells of the PW packet. A problem that the QoS priority of an ATM cell of a low priority in a PW packet is raised during PSN transport in the prior art is solved, thereby providing more accurate quality of service.

Persons of ordinary skill in the art should be aware that, units and algorithm steps of the examples described in combination with the embodiments disclosed in this document can be implemented by electronic hardware, such as a computer processor and a CPU, computer software or a combination of the two. To clearly illustrate the interchangeability between the hardware and the software, the foregoing illustration has generally described compositions and steps of each example according to functions. Whether the functions are executed by hardware or software depends on particular applications and design constraint conditions of the technical solutions. Persons skilled in the art can use different methods to implement the described functions for every particular application, but it should not be considered that the implementation goes beyond the scope of the present invention.

The steps of a method or algorithm described in combination with the embodiments disclosed in this document may be implemented directly by hardware, a software module executed by a processor, or a combination of the two. The software module may be located in a random access memory (RAM), a memory, a read only memory (ROM), an electrically programmable ROM, an electrically erasable programmable ROM, a register, a hard disk, a removable disk, a CD-ROM, or a storage medium of any other form well known in the art. The method for maintaining quality of service QoS, the provider edge PE device and the ATM PWE3 system provided in the embodiments of the present invention are introduced in detail above. Specific examples are utilized to illustrate the principle and implementation manners of the present invention in this document. The illustration of the foregoing embodiments is only used to help understand the method and the core idea of the present invention, and should not be construed as a limitation on the present invention.

What is claimed is:

1. A method for maintaining quality of service (QoS), comprising:
   identifying, by a provider edge (PE) device, a cell loss priority (CLP) and a service type of a received asynchronous transfer mode (ATM) cell, and obtaining a corresponding quality of service-QoS label according to the CLP and the service type;
   performing a comparison to determine whether the QoS label corresponding to the received ATM cell is the same as a QoS label corresponding to an existing ATM cell buffered in a local buffer; and
   in response to determining the QoS labels are different, encapsulating the buffered ATM cell into a pseudo wire (PW) packet and sending the PW packet, wherein the QoS label corresponding to the buffered ATM cell is used as a QoS label of a packet switched network (PSN) transport header of the PW packet or is used as QoS labels of both the PSN transport header and a PW header of the PW packet, and buffering the received ATM cell.

2. The method according to claim 1, wherein buffering the received ATM cell comprises:
   buffering the received ATM cell in a combination and buffering subunit of the local buffer, wherein the combination and buffering subunit is configured to buffer an ATM cell belonging to a same virtual circuit connection (VCC) or virtual path connection (VPC) as the received ATM cell.

3. The method according to claim 2, wherein performing the comparison to determine whether the QoS label corresponding to the received ATM cell is the same as a QoS label corresponding to the existing buffered ATM cell comprises:
   identifying the VCC or VPC to which the received ATM cell belongs;
   comparing the QoS label corresponding to the received ATM cell to the QoS label corresponding to the ATM cell buffered in the combination and buffering subunit.

4. The method according to claim 1, further comprising;
   after buffering the received ATM cell, determining that a QoS label corresponding to a further received ATM cell is the same as the QoS label corresponding to the buffered received ATM cell;
   in response to determining the QoS labels of the buffered received ATM cell and the further received ATM cell are the same, buffering the further received ATM cell;
   determining that the buffered received ATM cell and the buffered further received ATM cell meet a sending condition, and in response thereto, encapsulating the buffered received ATM cell and the buffered further received ATM cell into a further PW packet in a concatenation manner and sending the further PW packet, wherein the QoS label corresponding to the buffered received ATM cell and the buffered further received ATM cell is used as a QoS label of a PSN transport header of the further PW packet, or is used as QoS labels of both the PSN transport header and a PW header of the further PW packet.

5. A provider edge (PE) device, comprising:
   a priority obtaining unit, configured to identify a cell loss priority (CLP) and a service type of a received asynchronous transfer mode (ATM) cell, and to obtain a corresponding quality of service (QoS) label according to the CLP and the service type;
   a processing unit, configured to determine whether an ATM cell is stored in a combination and buffering unit, and in response to determining that an ATM cell is stored in the combination and buffering unit, perform a comparison to determine whether the QoS label corresponding to the received ATM cell is the same as a QoS label corresponding to a buffered ATM cell stored in a combination and buffering unit; the processing unit being further configured (1) in response to determining that the QoS labels are the same, to instruct the combination and buffering unit to buffer the received ATM cell, and (2) in response to determining that the QoS labels are different, to instruct an encapsulation and sending unit to encapsulate and send the ATM cell stored in the combination and buffering unit and instruct the combination and buffering unit to buffer the received ATM cell;

the combination and buffering unit, configured to, according to an instruction of the processing unit, buffer the received ATM cell; and the encapsulation and sending unit, configured to, according to an instruction of the processing unit, encapsulate the ATM cell buffered in the combination and buffering unit into a pseudo wire (PW) packet and send the PW packet, wherein the QoS label corresponding to the buffered ATM cell is used as a QoS label of a packet switched network (PSN) transport header of the PW packet, or is used as QoS labels of both the PSN transport header and a PW header of the PW packet.

6. The PE device according to claim 5, wherein
the combination and buffering unit comprises at least one combination and buffering subunit, and each combination and buffering subunit is configured to buffer an ATM cell of one virtual circuit connection (VCC) or virtual path connection (VPC).

7. The PE device according to claim 6, wherein
the processing unit is further configured to identify a VCC or VPC to which the received ATM cell belongs and compare the QoS label corresponding to the received ATM cell is to the QoS label corresponding to the ATM cell buffered in the combination and buffering subunit.

8. The PE device according to claim 5, wherein
the processing unit is further configured to, in response to determining that no ATM cell is stored in the combination and buffering unit, instruct the combination and buffering unit to buffer the received ATM cell.

9. The PE device according to claim 5, wherein
the processing unit is further configured to, when multiple ATM cells are stored in the combination and buffering unit, determine whether the multiple ATM cells meet a sending condition, and in response to determining that the multiple ATM cells meet the sending condition, instruct the encapsulation and sending unit to encapsulate and send the multiple ATM cells stored in the combination and buffering unit.

10. An asynchronous transfer mode pseudo wire emulation edge to edge (ATM PWE3) system, comprising: a customer edge (CE) device and a provider edge (PE) device connected to the CE device, wherein the CE device is configured to send an asynchronous transfer mode (ATM) cell to the PE device; and the PE device is configured to:
receive the ATM cell sent by the CE device,
identify a cell loss priority (CLP) and a service type of the received ATM cell,
obtain a corresponding quality of service QoS label according to the CLP and the service type,
perform a comparison to determine whether the QoS label corresponding to the received ATM cell is the same as a QoS label corresponding to an existing ATM cell buffered in a local buffer;
in response to determining the QoS labels are the same, buffer the received ATM cell; and
in response to determining the QoS labels are different, encapsulate the existing buffered ATM cell into a pseudo wire (PW) packet and send the PW packet, wherein the QoS corresponding to the existing buffered ATM cell is used as a QoS label of a packet switched network (PSN) transport header of the PW packet or is used as QoS labels of both the PSN transport header and a PW header of the PW packet, and buffer the received ATM cell.

* * * * *

UNITED STATES PATENT AND TRADEMARK OFFICE
CERTIFICATE OF CORRECTION

PATENT NO.         : 9,065,764 B2
APPLICATION NO.    : 13/949832
DATED              : June 23, 2015
INVENTOR(S)        : Hu et al.

It is certified that error appears in the above-identified patent and that said Letters Patent is hereby corrected as shown below:

In the claims

Column 12, line 6, "quality of service" should be removed.

Column 13, line 35, "cell is to" should read -- cell to --.

Signed and Sealed this
Eighth Day of December, 2015

Michelle K. Lee
*Director of the United States Patent and Trademark Office*